April 27, 1954  D. T. BELL  2,677,103
TRANSFER CONDUCTANCE TEST SET
Filed Jan. 6, 1953

INVENTOR
D. T. BELL
BY
Walter M. Hiel
ATTORNEY

UNITED STATES PATENT OFFICE 2,677,103

TRANSFER CONDUCTANCE TEST SET

Delamar T. Bell, Chatham, N. J., assignor to Bell Telephone Laboratories, Incorporated, New York, N. Y., a corporation of New York Application January 6, 1953, Serial No. 329,866

6 Claims. (Cl. 324—62)

This invention relates to the art of electrical measuring and more particularly to apparatus for measuring either the short-circuit transfer conductance of a network or the short-circuit transfer conductance ratio of two networks.

In the construction of some of the more complex networks used in modern circuitry it is sometimes found necessary to measure the short-circuit transfer conductance of a complicated three-terminal network. In some cases the absolute value of the conductance need not be known but rather it is essential that the short-circuit transfer conductance ratio of two networks be accurately known. Networks resolving themselves into two-terminal networks are easily measured with conventional bridge structures but when these networks are of the three-terminal type the transfer conductance and transfer conductance ratios are not readily measured on conventional bridges.

By the term "short-circuit transfer conductance" is meant the ratio of the output current of a network to the electromotive force applied to the input circuit with the output terminals short circuited. It will be found that this definition follows from the definition of transfer impedance given by Ernst A. Guillemin in his book "Communication Networks," volume 1, page 155.

It is the object of this invention to provide a circuit structure capable of accurately measuring either the short-circuit transfer conductance ratio of two networks or the absolute value of the short-circuit-transfer conductance of one network.

The foregoing object is achieved by this invention which provides a combination comprising two sets of test terminals for connection to the networks to be tested, some of the test terminals being so arranged as to connect the output circuits of the networks in parallel. A source of electromotive force is coupled to the other test terminals for connection to the input circuits of both of the networks and means is provided for determining the ratio of the input voltages to the two networks when the output voltage is substantially zero.

The invention may be better understood by referring to the accompanying drawings in which:

Fig. 1 discloses a simplified schematic of one embodiment of the invention;

Fig. 2 discloses a preferred embodiment of the invention;

Figure 1:
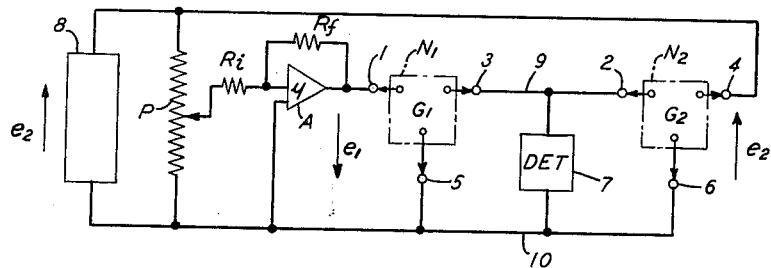

Reference is now made to Fig. 1 which discloses two sets of test terminals 1, 3, 5 and 2, 4, 6, respectively. Terminals 1, 3 and 5 are provided for connection to a three-terminal network $N_1$ while terminals 2, 4 and 6 are provided for connection to a second network $N_2$. Networks $N_1$ and $N_2$ have short-circuit transfer conductances of $G_1$ and $G_2$, respectively. Conductors 9 and 10 connect the output circuits of the two networks in parallel and a null voltage detector 7 is connected across conductors 9 and 10. A voltage source 8 provides an input voltage $e_2$ to the input terminals 4 and 6 and network $N_2$. Similarly, input voltage $e_1$ of opposite direction or phase is impressed upon the input terminals 1 and 5 of network $N_1$, this input voltage being derived from the source 8 through a potential divider P and an amplifier A. It will be understood from the definition given above for the short-circuit transfer conductance that the short-circuit transfer conductance ratio of the two networks will bear an inverse proportion to their input voltages. That is, the ratio of the conductances of networks $N_2$ and $N_1$ may be expressed by the following equation:

$$\frac{G_2}{G_1}=\frac{e_1}{e_2} \qquad (1)$$

This invention provides a convenient means for accurately determining the above-expressed voltage ratio when the output circuit voltage of the two networks is reduced to zero. Referring again to Fig. 1, the input voltage $e_2$ is maintained constant while the input voltage $e_1$ is varied by a potential divider P until the null detector 7 indicates the zero voltage condition. The circuit arrangement is such that potential divider P is calibrated to indicate directly the ratio of the voltage $e_1$ to $e_2$. In order to achieve this result it is necessary that the amplifier A maintain a substantially constant overall gain and that in the design of potential divider P the load effect of the input circuit to the amplifier is taken into account. These practical considerations are well known in the art. A substantially constant overall gain for amplifier A is provided by constructing this amplifier with a large feedback factor and a large forward gain $\mu$. The amplifier symbolically disclosed in Fig. 1 will be recognized as a conventional shunt feedback amplifier with resistor $R_i$ as the input resistor and resistor $R_f$ as the feedback resistor. If $\mu$ is taken as the forward gain through the amplifier from the input grid to the output plate, the overall gain is equal to the ratio of resistor $R_f$ to $R_1$ to a very close order of approximation if $\mu$ is sufficiently large. It is preferable that the forward gain $\mu$ be made very large, for example, in excess of ten million.

The source of electromotive force 8 may be either alternating or direct. It may be specifically mentioned that if this source provides direct current the amplifier A may be of the type disclosed in an article by Edwin A. Goldberg, published in the "R. C. A. Review" for June 1950, page 296. Amplifiers of this type have been constructed with a forward gain $\mu$ of twenty million.

In the ordinary use of this invention the overall gain of amplifier A is preferably made unity so that the output voltage $e_1$ of the amplifier is exactly equal but of opposite direction or phase, to the output voltage provided by potential divider P.

In the use of the apparatus of Fig. 1, two networks $N_1$ and $N_2$ to be tested are connected to the test terminals as shown. Potential divider P is adjusted until the null detector 7 indicates a zero voltage across conductors 9 and 10. This will be equivalent to a short-circuit condition across the output terminals of the two networks. The ratio of the input voltages $e_1$ and $e_2$ is then read directly from the calibrated potential divider P, thus yielding the ratio of the short-circuit conductances $G_2$ to $G_1$.

Figure 2:
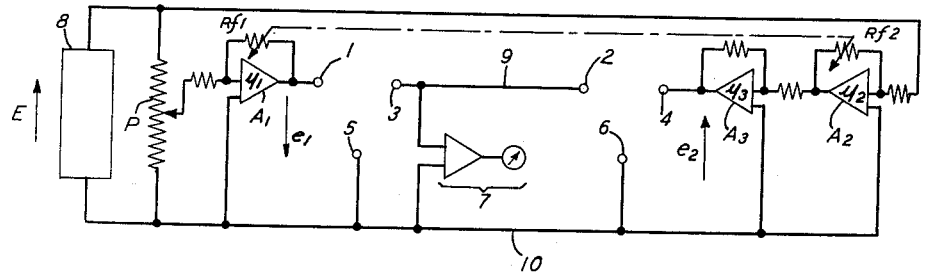

The arrangement shown in Fig. 2 is somewhat similar to that shown in Fig. 1 but differs therefrom by reason of the addition of amplifiers $A_2$ and $A_3$. Also, the null voltage detector 7 is symbolically indicated as an amplifier and meter combination and may, for example, be a conventional vacuum tube voltmeter. A requirement of this circuit, in order to provide convenient operation, is that the overall gains of amplifiers $A_1$ and $A_2$ should be always be equal. In order to provide a range of input voltages for testing the networks, amplifiers $A_1$ and $A_2$ may be provided with variable overall gains. This is accomplished by adjusting the two feedback resistors $R_{f1}$ and $R_{f2}$, thereby changing the overall gains of these amplifiers. The variation of these two feedback resistors must be such as to maintain the overall gains of these two amplifiers equal. Alternatively, these gains could be made unequal but maintained at a constant ratio, although this arrangement is not preferred.

Amplifier $A_3$ is provided to reverse the phase of the output obtained from amplifier $A_2$. Therefore, it is preferred that this amplifier have a large $\mu$ factor and an overall gain of unit. It will thus be seen that the input voltage $e_2$ may be adjusted to a predetermined level determined by the adjustment of the feedback resistor of amplifier $A_2$. The short-circuit transfer conductance ratio of the two networks is measured in the same way as for Fig. 1.

Figure 3:
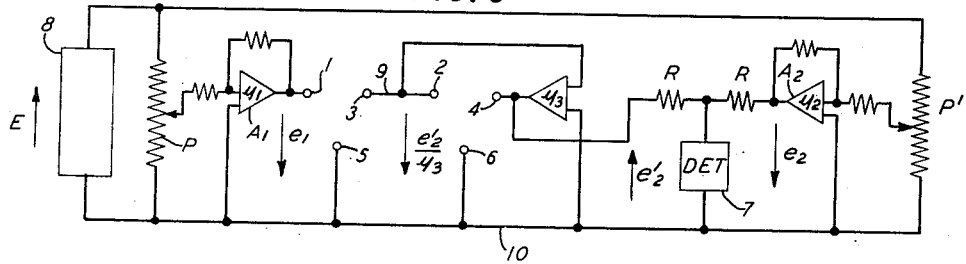
Fig. 3 shows a different embodiment of the invention.

The arrangement shown in Fig. 3 is of a somewhat different embodiment of the invention, differing in part to the extent that the null detector is connected between input terminals 4 and 6 instead of between the parallel-connected output terminals. Also, the input circuit of amplifier $A_3$ is connected across the parallel-connected output terminals. Since the forward gain $\mu_3$ of amplifier $A_3$ is made very large, the circuit will automatically maintain a substantially zero voltage across the output conductors 9 and 10. For example, if the input voltage across terminals 4 and 6 is $e_2'$ the input voltage to amplifier $A_3$ will be $$\frac{1}{\mu_3}$$

times this voltage. If $\mu_3$ is in the order of ten million or more, it will be evident that the voltage across conductors 9 and 10 may be automatically maintained at a very low level, approximately zero.

Without considering, for the moment, the operation of the null detector and amplifier $A_2$ it will be observed that if the two networks are connected to the two sets of test terminals and a voltage $e_1$ is applied to the input terminals 1 and 5 an output voltage will exist across the parallel-connected output terminals, which voltage is also the input voltage to amplifier $A_3$. Due to the very high gain of amplifier $A_3$ an output voltage of $e_2'$ is derived therefrom and is impressed upon the input test terminals 4 and 6. It will thus be evident that the two networks, together with amplifier $A_3$, comprise a conventional shunt feedback amplifier with the network connected to terminals 2 and 4 comprising the feedback network. By varying the voltage $e_1$ by means of potential divider P, the output voltage $e_2'$ from amplifier $A_3$ is also varied. Since the voltage across conductors 9 and 10 is automatically maintained at nearly zero voltage, it will be evident that the ratio of the short-circuit transfer conductances will always be determined to a very close approximation by the ratio of the voltages $e_1$ and $e_2'$.

Voltage $e_2$ is set at a predetermined fixed value. In Fig. 3 this voltage is derived from a potential divider $P'$ connected to the source 8, the output circuit of which is connected to the input circuit of amplifier $A_2$. By adjusting potential divider $P'$, the value of voltage $e_2$ may be established as desired. Thereafter, the test may proceed at this voltage level. It may here be mentioned that this voltage level also may be changed by varying the feedback resistors of amplifiers $A_1$ and $A_2$ in the same manner as previously described for Fig. 2.

The voltage $e_2'$ is made equal to the voltage $e_2$ by adjusting potential divider P. Equality is observed by means of the null indicator circuit comprising equal resistors R, R and the voltage detector 7. It is well known that such a detector circuit will indicate the equality of the voltages $e_2$ and $e_2'$ when the voltage appearing across the detector 7 is zero. This, of course, presupposes that the voltage polarities or voltage phases in the case of alternating currents are as indicated by the arrows adjacent to the voltage symbols on Fig. 3 as was the case in Figs. 1 and 2.

In operation, the circuit of Fig. 3 measures the short-circuit transfer conductance ratio of two networks by connecting them to the test terminals and adjusting the voltage $e_1$ by varying potential divider P until voltage $e_2'$ becomes equal to the fixed voltage $e_2$. This, of course, will be indicated by the zero voltage indication of detector 7. Potential divider P having been calibrated to read directly the ratio of voltage $e_1$ to voltage $e_2$, will thus directly indicate the short-circuit transfer conductance ratio.

Potential divider $P'$ requires no special precautions in its design. However, the design of potential divider P must take into consideration the loading introduced by the input circuit of amplifier $A_1$.

It may be mentioned that by reason of the very large feedback provided by the amplifiers, the output impedances become very low and consequently the output voltages are not greatly affected by the input impedances of the networks under test. This, of course, assumes that the input impedances of the networks remain sufficiently large compared to the amplifier output impedances.

Figure 4:
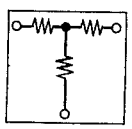
Figs. 4, 5 and 6 illustrate various types of networks which may be tested by the apparatus of the invention.
Figure 5:
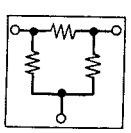
Figure 6:
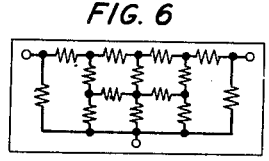

Figs. 4, 5 and 6 disclose three different types of networks which may be measured by the apparatus of the invention. It will be noted that even though a three-terminal network, such as shown in Fig. 6, may have any degree of internal complexity, its short-circuit transfer conductance is just as easily measured.

If it is desired to measure the absolute value of the short-circuit transfer conductance of a network, one of the networks must have a known standard value. It is preferred that the standard network be connected to terminals 1, 3 and 5. This standard network should have a known short-circuit transfer conductance well within the limits of the required accuracy and for this preferred location should have a transfer conductance greater than that of the unknown network. The unknown network to be measured is then connected to terminals 2, 4 and 6 and the apparatus adjusted as previously described. The short-circuit transfer conductance of the unknown network is then expressed by the following equation:

$$G_2 = \frac{G_1 e_1}{e_2}$$

In the above expression the symbols have the same meaning as they do in Equation 1. Since the short-circuit transfer conductance $G_1$ is known and since potential divider P reads directly the ratio of voltages $e_1$ and $e_2$, the unknown short-circuit transfer conductance is directly measured. If the standard network is made to have a decimal value, potential divider P may also directly indicate the unknown conductance without requiring any computation, the proper decimal multiplying factor being given by merely referring to the conductance value of the standard.

What is claimed is:

1. An apparatus for measuring the short-circuit transfer conductance ratio of two three-terminal networks, said networks having input and output circuits, said apparatus comprising two sets of three test terminals each for connecting said networks to the apparatus, a pair of conductors connecting two of the terminals of one set in parallel with two of the terminals of the other set, whereby the output circuits of the two networks may be connected in parallel, a source of electromotive force, means coupling said source between one of the remaining test terminals and one of said conductors for connection to the input circuit of one of the networks, another means coupling said source between said one conductor and the other of the remaining test terminals for connection to the input circuit of the other network, and means for determining the ratio of the input voltages to the two networks when the output voltage is substantially zero.

2. Apparatus for measuring the short-circuit transfer conductance ratio of two three-terminal networks, said apparatus comprising two sets of three test terminals each for connecting said networks to the apparatus, means connecting a pair of two of the terminals of one set in parallel with a pair of two of the terminals of the other set, a null voltage detector connected across said parallel-connected terminals, a source of electromotive force, circuit means connecting one terminal of one of said pairs of terminals and the third terminal of the same set to said source, an amplifier having an input circuit and an output circuit, means connecting said output circuit to said one terminal and to the third terminal of the other set, and circuit means including a potential divider for connecting the input circuit to said source.

3. Apparatus for measuring the short-circuit transfer conductance ratio of two three-terminal networks, said apparatus comprising two set of three test terminals each for connecting said networks to the apparatus, a pair of conductors connecting two of the terminals of one set in parallel with two of the terminals of the other set, a source of electromotive force, an amplifier means for connecting the source between one of said conductors and the third terminal of one of said sets, a second amplifier means and a potential divider for connecting said source between said one conductor and the remaining third terminal, and a null voltage indicator connected between said pair of conductors.

4. The combination of claim 3 and a means for adjusting the gains of said two amplifier means by equal amounts.

5. Apparatus for measuring the short-circuit transfer conductance ratio of two three-terminal networks, said apparatus comprising two sets of three test terminals each for connecting said networks to the apparatus, a pair of conductors connecting two of the terminals of one set in parallel with two of the terminals of the other set, a source of electromotive force, an amplifier and a potential divider for connecting the source between one of said conductors and the third terminal of one of said sets, a high gain amplifier having an input circuit and an output circuit, said input circuit being connected across said pair of conductors and said output circuit being connected between said one conductor and the remaining third terminal, and means including a voltage detector circuit also connected between said one conductor and the remaining third terminal.

6. The combination of claim 5 wherein said voltage detector circuit comprises a resistor and a voltage indicator connected in series, and a second resistor connected to the junction of the first-named resistor and the indicator and to a source of predetermined voltage.

References Cited in the file of this patent

UNITED STATES PATENTS

| Number | Name | Date |
|---|---|---|
| 2,294,941 | Tuttle | Sept. 8, 1942 |